United States Patent
Wang et al.

(10) Patent No.: US 12,486,183 B2
(45) Date of Patent: Dec. 2, 2025

(54) CARBON FIBER FILTER AND REGENERATION METHOD THEREFOR, AND WATER TREATMENT DEVICE

(71) Applicant: Wuhan University, Wuhan (CN)

(72) Inventors: Xu Wang, Wuhan (CN); Mingliang Wang, Wuhan (CN); Hui Wang, Wuhan (CN); Tao Xu, Wuhan (CN); Yimin Xie, Wuhan (CN); Xuhui Mao, Wuhan (CN); Jiangjun Hu, Wuhan (CN); Yi Li, Wuhan (CN); Yu Huang, Wuhan (CN); Yuanrou Fan, Wuhan (CN)

(73) Assignee: WUHAN UNIVERSITY, Wuhan (CN)

(*) Notice: Subject to any disclaimer, the term of this patent is extended or adjusted under 35 U.S.C. 154(b) by 693 days.

(21) Appl. No.: 17/887,493

(22) Filed: Aug. 14, 2022

(65) Prior Publication Data

US 2023/0212040 A1  Jul. 6, 2023

(30) Foreign Application Priority Data

Dec. 31, 2021 (CN) .......................... 202111667122.2
Dec. 31, 2021 (CN) .......................... 202111667157.6

(51) Int. Cl.
*C02F 1/461* (2023.01)
*C02F 1/463* (2023.01)

(52) U.S. Cl.
CPC .......... *C02F 1/46109* (2013.01); *C02F 1/463* (2013.01); *C02F 2001/46119* (2013.01); *C02F 2001/46133* (2013.01); *C02F 2001/46152* (2013.01); *C02F 2303/16* (2013.01)

(58) Field of Classification Search
CPC .................. C02F 1/46109; C02F 1/463; C02F 2001/46119; C02F 2001/46133; C02F 2001/46152; C02F 2303/16; C02F 1/283; B01J 20/20
See application file for complete search history.

(56) References Cited

U.S. PATENT DOCUMENTS

| | | | | |
|---|---|---|---|---|
| 4,576,929 A | * | 3/1986 | Shimazaki | C02F 1/283 423/447.2 |
| 5,242,879 A | * | 9/1993 | Abe | B01J 20/20 210/756 |
| 2012/0298570 A1 | * | 11/2012 | Osawa | B01D 25/24 210/252 |
| 2021/0053027 A1 | * | 2/2021 | Oturan | B01J 20/2808 |
| 2021/0254243 A1 | * | 8/2021 | Ryu | C01B 32/324 |

FOREIGN PATENT DOCUMENTS

JP     H07284618 A  * 10/1995

OTHER PUBLICATIONS

Machine Translation of JP-H07284618-A.*

* cited by examiner

*Primary Examiner* — Bryan D. Ripa
(74) *Attorney, Agent, or Firm* — JCIP GLOBAL INC.

(57) ABSTRACT

A carbon fiber filter includes a center filter body and carbon fiber yarn wound around the center filter body. The center filter body is hollow and includes a water outlet. A surface of the center filter body is provided with at least one inverted triangular groove. A plurality of through holes are arranged in the groove. The through holes and the water outlet are in communication with a hollow inner cavity of the center filter body. The carbon fiber yarn is wound in the groove with a constant force to form a filter layer.

10 Claims, 6 Drawing Sheets

CARBON FIBER FILTER AND REGENERATION METHOD THEREFOR, AND WATER TREATMENT DEVICE

CROSS-REFERENCE TO RELATED APPLICATIONS

Pursuant to 35 U.S.C. § 119 and the Paris Convention Treaty, this application claims foreign priority to Chinese Patent Application No. 202111667122.2 filed Dec. 31, 2021, and to Chinese Patent Application No. 202111667157.6 filed Dec. 31, 2021. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to the field of water or sewage filtration technologies, and more particularly, to a carbon fiber filter and a regeneration method therefor, and an electroflocculation-fiber filtration water treatment device.

Microfiltration is a low-pressure driven membrane technology with an operational pressure of usually 0.35 MPa and an initial flux ranging from $10^{-4}$ to $10^{-2}$ m/s. Due to the porosity and relatively large internal surface area of a microfiltration membrane which removes suspension colloids and particles typically ranging from 0.1 μm to 1 μm such as the separation of bacteria, yeast, and mammalian cells, purification and sterilization of gas and virus-containing solutions, purification in food processing, oil-water separation, and wastewater treatment. In the wastewater treatment, microfiltration is usually adopted as a method for pretreatment to remove suspended particles and colloids.

The filtration technology is also widely used for wastewater treatment. The mechanism of the membrane separation technology is size exclusion (e.g. microfiltration). During this process, pollutants are accumulated at the membrane interface and pores within the membrane, which eventually leads to membrane fouling, resulting in a significant flux reduction and high energy consumption. Therefore, methods are needed to resolve the problems. In the prior art, an online chemical cleaning system for ultrafiltration/microfiltration membranes is available in units, while the chemical washing reagents used are only of food grade to ensure that no harmful cleaning sewage is produced. The existing bubble generator and sharp spike device implement pollution cleaning on a micropore membrane tube wall through a bubble explosion effect. However, the cleaning device has a complex structure, and the vent tube is prone to blockage, which cannot completely remove the membrane fouling. In addition, in the nanobubble technology and the membrane cleaning technology used with chemical cleaning, the cleaning process is relatively complex, and the generation of nanobubbles depends on a bubble generator, which is prone to blockage. Overall, the conventional in-situ physical cleaning structure is complex, and chemical cleaning has an irreversible impact on a membrane structure, reducing the service life of the membrane, and increasing the use costs of the membrane separation technology.

SUMMARY

A first objective of the disclosure is to provide a carbon fiber filter with controllable filter pore size and strong anti-pollution performance, which can be electrochemically cleaned in-situ.

A second objective of the disclosure is to provide a regeneration method for the carbon fiber filter, which is simple and can implement in-situ regeneration.

A third objective of the disclosure is to provide an electroflocculation-fiber filtration water treatment device, which has good flocculation and filtration effects and can implement in-situ regeneration of a filter layer.

A solution adopted to achieve the first objective of the disclosure is to provide a carbon fiber filter, including a center filter body and carbon fiber yarn wound around the center filter body, where the center filter body is hollow and comprises a water outlet, a surface of the center filter body is provided with at least one groove, a plurality of through holes are arranged in the groove, the through holes and the water outlet are in communication with a hollow inner cavity of the center filter body, and the carbon fiber yarn is wound in the groove with a constant force to form a filter layer.

In a class of this embodiment, the groove is an inverted triangular groove with a lowermost angle of 10° to 160°.

In a class of this embodiment, the carbon fiber yarn is wound in the groove with a constant force of 10 N to 200 N.

In a class of this embodiment, the carbon fiber yarn is modified carbon fiber yarn obtained through acid leaching.

An acid modification method is as follows: Cleaned carbon fibers are soaked in a 45 wt. % $HNO_3$ solution, heated at 60° C. for 2 h, and then rinsed with ultrapure water until the pH does not change.

After the carbon fiber yarn is modified through acid leaching, the electrical conductivity, hydrophilicity and the fouling control of the carbon fiber yarn are improved.

In a class of this embodiment, the carbon fiber yarn is modified carbon fiber yarn obtained through ablation at a high temperature of 200° C. to 700° C.

A high-temperature ablation modification method is as follows: High temperature treatment is performed at 400° C. to 600° C. after the carbon fiber yarn is cleaned and dried, and the carbon fiber yarn is then cleaned and dried after being cooled down and taken out, to obtain the modified carbon fiber yarn.

In addition, properties such as hydrophilicity and surface charge of the carbon fiber yarn can be adjusted in different modification methods, so as to be suitable for the separation of sewage with different properties.

A solution adopted to achieve the second objective of the disclosure is to provide a regeneration method for the carbon fiber filter. The carbon fiber yarn is placed as a cathode in an electrolyte for backwashing, water electrolysis is performed after the carbon fiber yarn communicates with an anode, to generate a large quantity of microbubbles at the cathode, and a surface of the carbon fiber yarn is washed for regeneration using the clean electrolyte and the microbubbles.

In a class of this embodiment, the carbon fiber yarn is placed as the cathode in the electrolyte after the constant force on the carbon fiber yarn is removed.

In a class of this embodiment, a voltage of 1.2 to 8 V is applied between the cathode and the anode in the water electrolysis.

The electrolyte is not excessively limited. During regeneration, the electrolyte is only used for ion migration to form a current loop without changing itself (for example, forming precipitation or gas such as chlorine gas). A commonly used electrolyte is at least one of $Na_2SO_4$, $K_2SO_4$, $Na_2CO_3$, or $K_2CO_3$, and other electrolytes may also be selected as required.

A solution adopted to achieve the third objective of the disclosure is to provide an electroflocculation-fiber filtration water treatment device, including the carbon fiber filter, a cathode, and an anode. The cathode is a cathode of a conductive carbon fiber filter, and the anode is an electroflocculation anode plate.

In a class of this embodiment, the carbon fiber yarn is modified carbon fiber yarn obtained through acid leaching or pyrolysis.

In a class of this embodiment, the anode is an electroflocculation anode plate located upstream of a water flow direction, and the cathode is located downstream of the water flow direction. The electroflocculation anode plate comprises one or more of iron, aluminum, an aluminum-containing composite material, and an iron-containing composite material.

In a class of this embodiment, the electroflocculation-fiber filtration water treatment device is configured to perform water treatment, and a pH of raw water is adjusted to 8 to 9 before the water treatment. A current density is adjusted to 90 to 110 $A/m^2$ in an electrification process of the water treatment. An electrification reaction time of the water treatment is controlled between 30 to 40 min.

The disclosure has the following advantages and beneficial effects:

In the fiber filter of the disclosure, high-strength carbon fiber yarn is wound in the groove with a constant force, so that fibers in the groove are gathered directionally and densely and form filter holes. A pore size of a filter layer formed as the winding layer thickened gradually decreases along a water flow direction. The pore size of the filter layer is controllable by mechanically changing the pulling force. Raw water is filtered from the outside of the fibers, a filtrate flows out from the inside of a filter column, and minimum pollutants of about 0.1 μm can be accumulated.

The surface of the carbon fiber yarn has a strong anti-pollution capability, so that backwashing and chemical regeneration have better regeneration effects. Compared with formed filter materials such as ordinary filter materials and microfiltration membranes, the constant force applied to the carbon fiber yarn in the disclosure can be removed freely. After a tension applied to the carbon fiber yarn is removed, backwashing is performed to flush out pollutants in pores, effectively preventing the pores of the filter material from being permanently blocked.

The carbon fiber yarn has a certain adsorption effect on some macromolecular organic substances such as humic acids, which can selectively remove pollutants.

Due to excellent electrical conductivity, the carbon fiber yarn is used as a cathode. When electricity is applied, a large quantity of microbubbles from water electrolysis clean the surface of the carbon fiber, thereby implementing in-situ regeneration of the carbon fiber filter material.

Moreover, the electrically conductive carbon fiber yarn may also be used with an electroflocculation-fiber filtration device for water treatment. A conductive carbon fiber filter at the cathode is made of a low-cost carbon fiber yarn material. By winding the carbon fiber yarn in the groove of the center filter body, filtration performance similar to that of a conventional membrane module is achieved. In addition, the conductive performance of the carbon fiber material is also fully utilized in the art, so that the carbon fiber filter is used as a cathode during electroflocculation. Flocs accumulated on the surface of the fiber filter are simultaneously removed by using gas generated at the cathode, so that the flux of the filter is more stable. This not only improves the quality of effluent in comparison with a separate electroflocculation technology, but also alleviates a problem of blockage and pollution caused by a conventional micro/ultra-membrane filtration process. The coupled device can treat wastewater with high concentration of organic matters and suspended substances, providing a great flexibility for future applications.

In the drawings, the following reference numbers are used: 1. Outer tank body; 2. Upper cover plate; 3. Rubber pad; 4. Fixing bolt; 5. Gas inlet; 6. Water inlet; 7. Tank body water outlet; 8. Support plate; 9. Center filter body; 10. Inverted triangular groove; 11. Carbon fiber yarn; 12. Water outlet; 13. Anode; 14. Electrolyte; 15. Electroflocculation reaction tank body; 16. Electroflocculation water inlet; 17. Electroflocculation water outlet; 18. Electroflocculation anode plate; 19. Anode wire; 20. Cathode wire; 21. Direct current power supply; 22. Stirring device; 23 Support structure; and 24. Spiral center filter body.

DETAILED DESCRIPTION

To better understand the disclosure, the following embodiments are to further illustrate the disclosure, but not used to limit the content of the disclosure.

Embodiment 1

Figure 1:
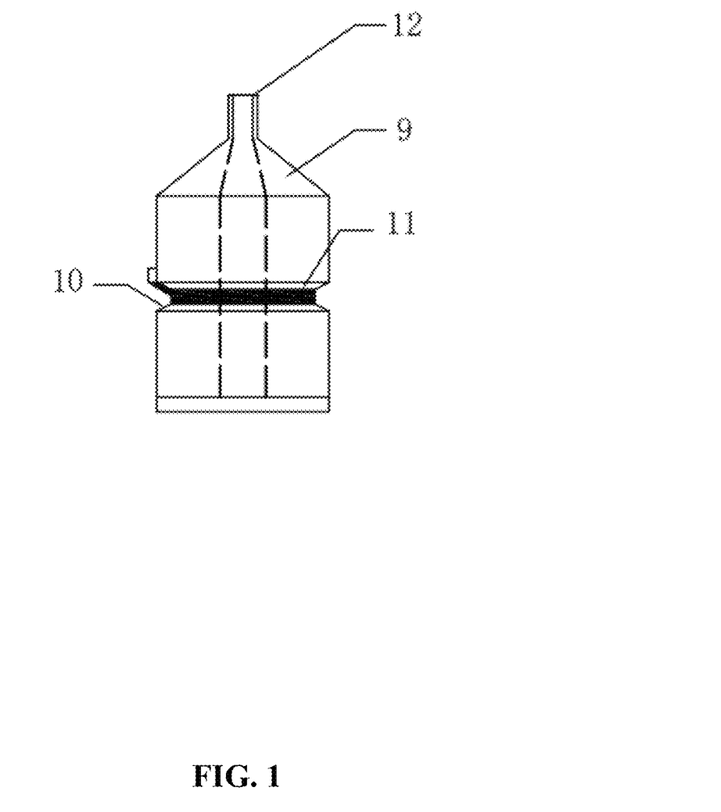
FIG. 1 is a schematic structural diagram of a fiber filter according to the disclosure.

FIG. 1 shows a structure of a preliminary test model of a carbon fiber filter, including a center filter body 9 and carbon fiber yarn 11 wound around the center filter body 9. The center filter body 9 is hollow and comprises a water outlet 12. A surface of the center filter body 9 is provided with at least one groove 10. A plurality of through holes are arranged in the groove 10. The through holes and the water outlet 12 are in communication with a hollow inner cavity of the center filter body 9. The carbon fiber yarn 11 is wound in the groove 10 with a constant force to form a filter layer. One end of the carbon fiber yarn 11 is fixed on an outer wall of the center filter body 9, and the other end of the carbon fiber yarn 11 is fixed on a metal bar. A tension is applied to the metal bar by a tension meter, to wind the carbon fiber yarn 11 in the groove 10, and finally fix the metal bar on the center filter body 9. The groove 10 is an inverted triangular groove 10 with a lowermost angle of 10° to 160°. The carbon fiber yarn 11 is wound on a surface of the groove 10 with a constant force of 10 N to 200 N. In this embodiment, the carbon fiber yarn 11 is pretreated PAN carbon fiber filament yarn. In other embodiments, the carbon fiber yarn 11 may alternatively be modified carbon fiber yarn obtained through acid leaching or ablation at a high temperature of 200° C. to 700° C.

A filtering process is as follows: The center filter body 9 is immersed in raw water. A pressure acts on a surface of the raw water. Particles in the raw water larger than a filter pore size are accumulated at the filter layer formed by winding the carbon fiber yarn 11. Some macromolecular organic substances such as humic acids are adsorbed by the surface of the carbon fiber yarn 11, and the remaining substances that cannot be accumulated are discharged through the water outlet 12 of the center filter body 9.

Figure 2:
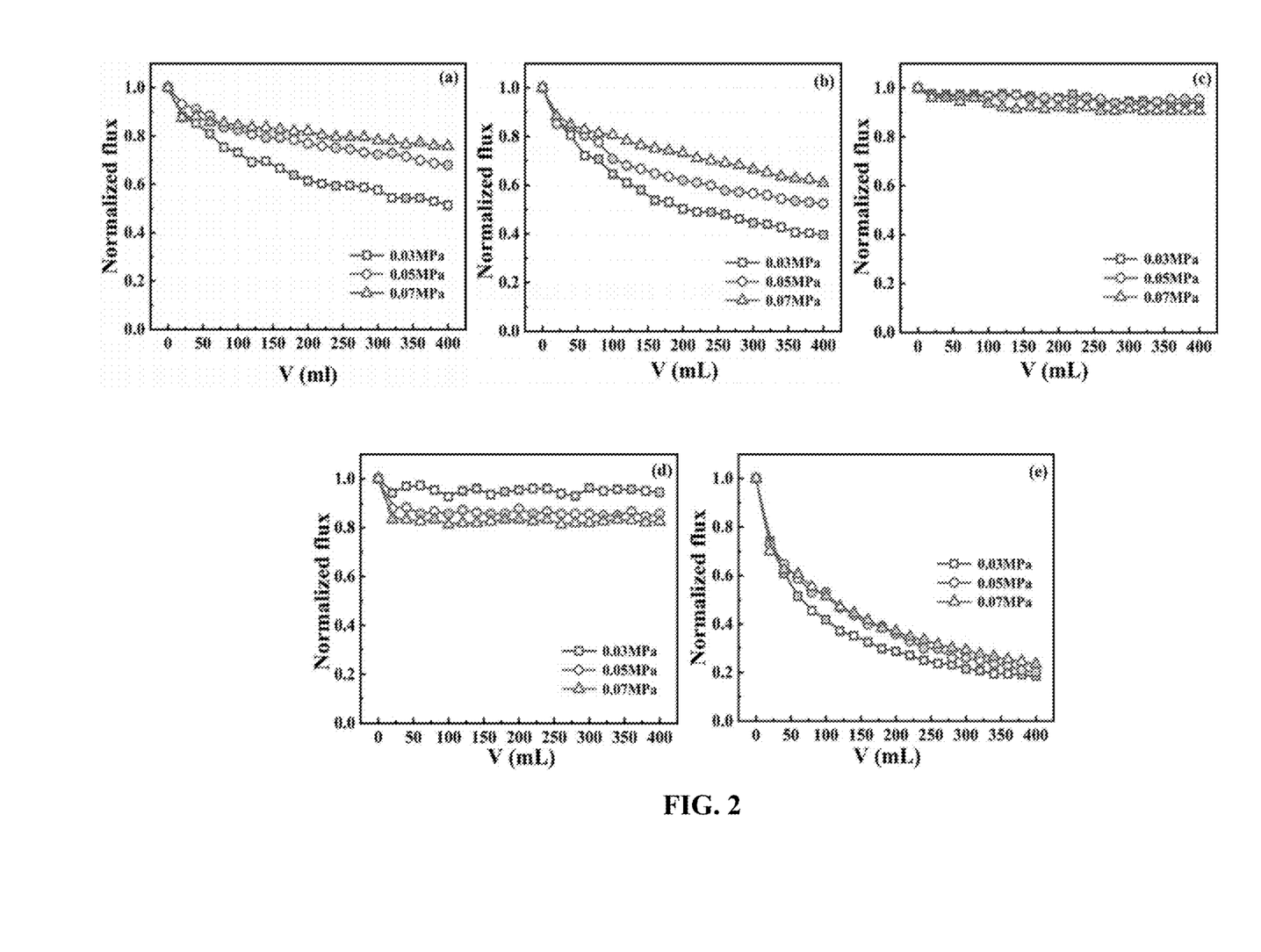
FIG. 2 shows flux changes caused by filtering different pollutants using a fiber filter of the disclosure under different operation pressure conditions.

The modified carbon fiber yarn 11 is uniformly wound in the inverted triangular groove 10 of the center filter body 9 with a constant force of 25 N. FIG. 2 shows flux changes caused by filtering different pollutants under different operation pressure conditions by a fiber filter under this condition, where (a) represents humic acid, (b) represents sodium alginate, (c) represents bovine serum albumin, (d) represents kaolin, and (e) represents a mixed solution. Results indicate that as the pressure increases, a reduction rate of filtration specific flux of the fiber filter decreases. This is because the operation pressure affects a residence time of the solution. A greater operation pressure indicates a shorter residence time of the solution in the filter and a lower degree of contamination of a filter medium. The fiber filter is contaminated with the humic acid, sodium alginate, and mixed solution, resulting in a decrease in filtration flux.

Figure 3:
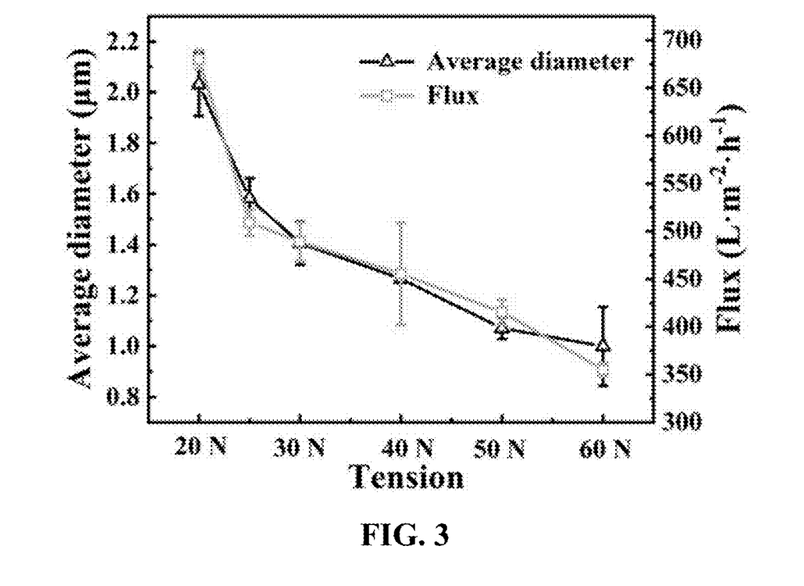
FIG. 3 is a relationship diagram of impact of a tension on an average pore size of a carbon fiber filter layer of the disclosure and a magnitude of a pure water flux.
Figure 4:
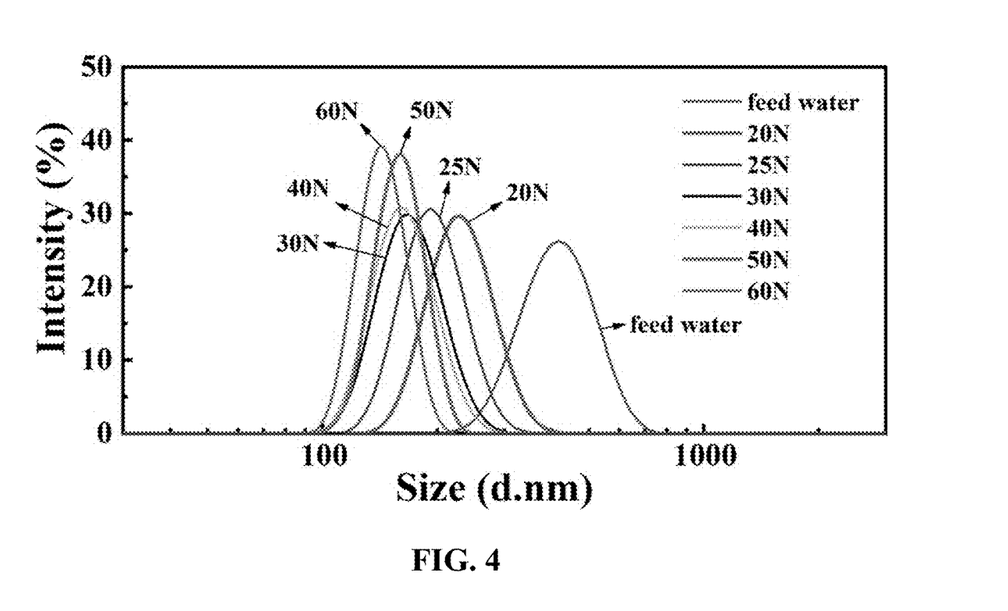
FIG. 4 is a distribution diagram of particle sizes of a kaolin suspension before and after filtration by a fiber filter of the disclosure under different tensions.

The same volume of a suspension including 200 mg/L 6000 mesh ultrafine kaolin is filtered by the fiber filter wound with different tensions (20 N, 25 N, 30 N, 40 N, 50 N, and 60 N). A constant pressure of 0.07 MPa is applied to the raw water. A filtration pressure difference is monitored by using a pressure gauge. The raw water is continuously added during filtration to keep the center filter body 9 be immersed under the liquid level. An average pore size and pure water flux of the fiber filter wound with different tensions are measured, and a particle size of the suspension before and after filtration is measured.

FIG. 3 is a relationship diagram of impact of a tension on an average pore size of a filter layer and a magnitude of pure water flux. As shown in the figure, as the tension applied to the carbon fiber yarn increases, the average pore size of the filter layer tends to decrease. When the tension increases from 20 N to 50 N, the average pore size of the filter layer gradually decreases from about 2.0 µm to 1.1 µm. When the tension increases to 25 N, the average pore size of the filter layer changes greatly. When the tension increases from 50 N to 60 N, the average pore size increases slightly, which may be an error caused by the unstable tension. A diameter of a carbon fiber monofilament is about 7 µm. When the carbon fiber yarn is wound with a constant force of more than 25 N applied, the pore size of the filter layer may be 1.6 µm. When the constant force reaches 60 N, a filter layer with an average pore size of 1 µm may be formed, and particles with a minimum size of 0.1 µm may be accumulated, so that suspension colloids and particles in the raw water can be effectively removed. The change of the pure water flux further verifies the impact of the tension on the pore size. With the increase in the constant force on the fiber and the decrease in the pore size, the pure water flux obviously tends to decrease. It can be learned that, the pore size of the filter layer of the fiber filter and filtration precision can be changed by changing the tension, so that it is possible to implement precise control of the separation of particles with different sizes.

A turbidity of the suspension including 200 mg/L 6000 mesh ultrafine kaolin is 255.9 NTU. Under all tension conditions, a removal rate of the filter for the turbidity of the suspension can reach over 99.5%, and a turbidity of the filtered water ≤0.13 NTU.

FIG. 4 is a distribution diagram of particle sizes of a kaolin suspension before and after filtration by a fiber filter of the disclosure under different tensions. As shown in the figure, a peak particle size of a particle in the suspension is 420.0 nm. When the tension increases from 20 N to 60 N, a peak particle size of the filtered water decreases from 232.8 nm to 144.2 nm. Such a change trend is consistent with a change trend of a pore size in FIG. 5, which further indicates that as the applied constant force increases, the pore size of the filter layer decreases, and the trapping effect on the particles is enhanced.

Embodiment 2

In this embodiment, carbon fiber yarn is first modified through acid leaching in the following method: The carbon fiber yarn is modified using an acid leaching modification method. The carbon fiber yarn is placed in an acetone solution, condensed and refluxed for 48 h in a water bath at 60° C., and rinsed with ultrapure water for several times, so that impurities and organic polymer layers can be removed from the fiber surface in this process. Then, degummed carbon fibers are soaked in a 45 wt. % $HNO_3$ solution, heated at 60° C. for 2 h, and then rinsed with ultrapure water until the pH does not change. The modification method can improve the hydrophilicity of carbon fibers and is suitable for oil-water separation of oily wastewater.

A carbon fiber filter prepared by modified carbon fiber yarn 11 is used to filter the oily wastewater. The oily wastewater is mainly a mixture of diesel oil, SDBS, and water. A filtering process is as follows: The modified carbon fiber yarn 11 is uniformly wound in an inverted triangular groove 10 of a center filter body 9 with a constant force of 25 N. The fiber filter is placed in the oily wastewater. A constant pressure of 0.07 megapascal is applied to raw water. A filtration pressure difference is monitored and adjusted by using a pressure gauge. The oily wastewater is continuously added during filtration to keep the center filter body 9 be immersed under the liquid level. The oily wastewater is pressed from outside into a hollow cavity of the center filter body 9. Oil droplets in the oily wastewater are accumulated at a filter layer formed by the carbon fiber yarn 11 wound in the inverted triangular groove 10. A filtrate flows out from the inside of the center filter body 9, to implement oil-water separation. After filtration, an oil content of a liquid before and after the filtration is measured by n-hexane extraction.

During the filtration, flux decreases because the accumulated oil droplets are adhered to the surface and interior of the filter layer. Backwash with electrochemical cleaning for regeneration is performed on the carbon fiber yarn. The filtered center filter body 9 is taken out and placed in an electrolyte. A dimensionally stable anode is used as an anode, and the carbon fiber yarn 11 on the center filter body 9 is used as a cathode. A voltage is applied to generate a large quantity of microbubbles to wash the oil droplets on the surface of the carbon fiber yarn 11 for backwash, and the carbon fiber yarn 11 is cleaned from the inside to the outside of the filter body by using backwash water, to achieve a better flux recovery effect. Results indicate that under a condition of 25 N, a removal rate of the acid modified carbon fiber for the oily wastewater reaches 93.51%. After backwash with electrochemical cleaning, the flux is recovered to 59.32% of an original flux.

Embodiment 3

Figure 5:
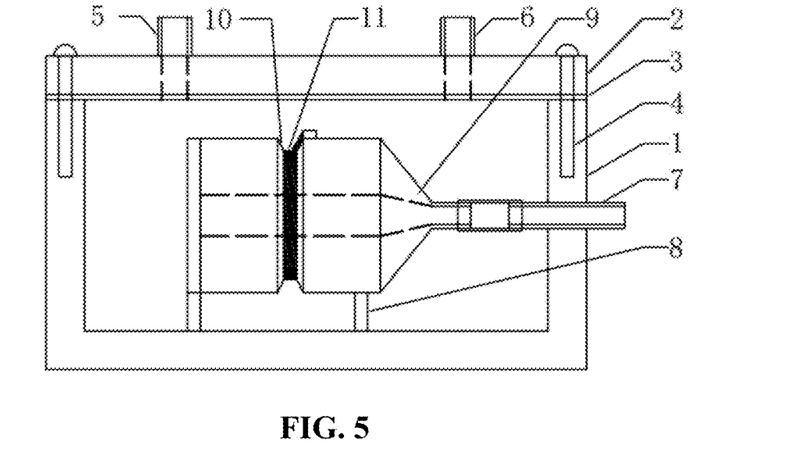
FIG. 5 is a schematic structural diagram of a fiber filter in Embodiment 3.

FIG. 5 is a schematic structural diagram of a fiber filter whose main structure from outside to inside is an outer tank body 1, an upper cover plate 2, a rubber pad 3, a fixing bolt 4, a gas inlet 5, a water inlet 6, a tank body water outlet 7, a support plate 8, a center filter body 9, an inverted triangular groove 10, and carbon fiber yarn 11. Pretreated PAN carbon fiber yarn 11 is uniformly wound in the inverted triangular groove 10 of the center filter body 9 with a constant force of 10 N to 200 N (where 25 N is adopted in this embodiment). A water outlet of the center filter body 9 and the tank body water outlet 7 are connected by a hose. The center filter body 9 is supported on the support plate 8. The upper cover plate 2 and the rubber pad 3 are fixed on the outer tank body 1 with the fixing bolt 4. The gas inlet 5 and the water inlet 6 are mounted on the upper cover plate 2, the gas inlet 5 is connected to a nitrogen bottle, and the water inlet 6 is connected to a peristaltic pump, to form an enclosed environment in the tank body. Through model simulation, after the constant force of 25 N is applied, carbon fibers are loosely distributed outside the groove and relatively densely distributed inside the groove.

When the fiber filter of this embodiment is used for filtration, raw water is first filled through the water inlet 6, a constant pressure of 0.03 to 0.07 MPa is applied in the outer tank body 1 through the gas inlet 5 by adjusting a pressure relief valve of the nitrogen bottle, and a filtration pressure difference is monitored and adjusted by using a pressure gauge.

During filtration, the peristaltic pump is used to continuously add the raw water to the outer tank body 1 through the water inlet 6, to keep the center filter body 9 be immersed under the liquid level in the outer tank body 1. A pressure acts on a surface of the raw water. Particles in the raw water larger than a filter pore size are accumulated at a filter layer formed by winding the carbon fiber yarn 11. Some macromolecular organic substances such as humic acids are adsorbed by the surface of the carbon fiber yarn 11, and the remaining substances that cannot be accumulated are discharged through the water outlet of the center filter body 9 and the tank body water outlet 7.

Embodiment 4

Figure 6:
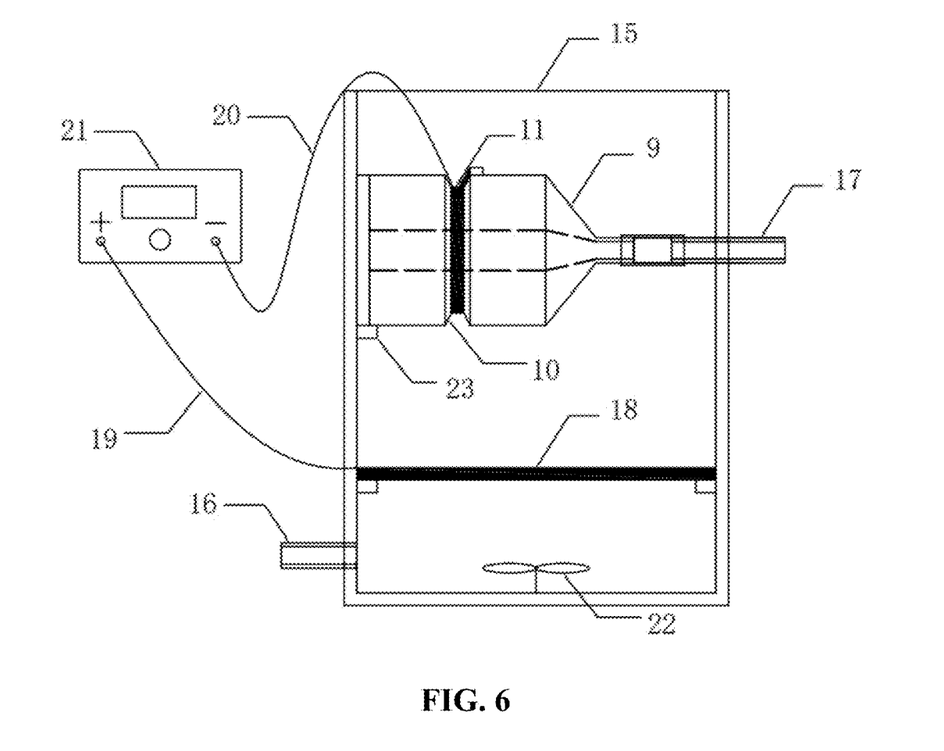
FIG. 6 is a schematic structural diagram of an electroflocculation-fiber filtration water treatment device in Embodiment 4.

FIG. 6 shows an electroflocculation-fiber filtration water treatment device, including an electroflocculation reaction tank body 15. The bottom of one side of the electroflocculation reaction tank body 15 is provided with an electroflocculation water inlet 16, and the top of one side of the electroflocculation reaction tank body 15 is provided with an electroflocculation water outlet 17 opposite to the electroflocculation water inlet 16. An anode and a cathode are arranged in the electroflocculation reaction tank body 15. The anode is an electroflocculation anode plate 18, and the cathode is a cathode of a conductive carbon fiber filter, the conductive carbon fiber filter being formed by a center filter body 9 and carbon fiber yarn 11 wound around the center filter body 9. The electroflocculation anode plate 18 is located upstream of a water flow direction and can be connected to a positive electrode of a direct current power supply 21 through an anode wire 19. The cathode of the carbon fiber filter is located downstream of the water flow direction and can be connected to a negative electrode of the direct current power supply 21 through a cathode wire 20. A stirring device 22 is arranged at the inner bottom of the electroflocculation reaction tank body 15. A support structure 23 is mounted on an inner wall of the electroflocculation reaction tank body 15. The center filter body 9 is hollow and includes the electroflocculation water outlet 17. A surface of the center filter body 9 is provided with at least one inverted triangular groove 10. A plurality of through holes are arranged in the inverted triangular groove 10. The through holes and the electroflocculation water outlet 17 are in communication with a hollow inner cavity of the center filter body 9. The carbon fiber yarn 11 is wound in the inverted triangular groove 10 with a constant force to form a filter layer.

In this embodiment, a lowermost angle of the inverted triangular groove 10 is 10° to 160°.

In this embodiment, the carbon fiber yarn 11 is wound in the inverted triangular groove 10 with a constant force of 10 N to 200 N.

In this embodiment, the electroflocculation anode plate 18 may comprise one or more of iron, aluminum, an aluminum-containing composite material, and an iron-containing composite material.

In other embodiments, the carbon fiber yarn 11 may be modified carbon fiber yarn obtained through acid leaching or ablation at a high temperature of 200° C. to 700° C.

A water treatment method performed by using the electroflocculation-fiber filtration water treatment device of this embodiment includes the following steps:

(1) Introduce sewage into the electroflocculation reaction tank body 15, turn on the stirring device 22, respectively connect the cathode wire 20 and the anode wire 19 to the carbon fiber yarn 11 and the electroflocculation anode plate 18, turn on the direct current power supply 21, and stop energizing after reaction lasts for a period of time.

(2) Pump water from the water outlet by using a peristaltic pump, and use the cathode of the fiber filter for filtration.

(3) Turn on the direct current power supply 21, reversely introduce backwash water from the electroflocculation water outlet 17, and perform backwash with electrochemical cleaning on the carbon fiber filter for regeneration.

(4) Repeat the foregoing steps, and continuously treat the sewage.

A pH of the sewage described in step (1) should be adjusted to 8 to 9 before the introduction, and a corresponding optimum pH should be adjusted according to different types of pollutants to achieve the best treatment effect.

A current density in the electrification process described in step (1) should be adjusted to 90 to 110 A/m$^2$, and a corresponding optimum current density should be adjusted according to different types of pollutants to achieve the best treatment effect.

The reaction time described in step (1) should be controlled within 30 to 40 min to ensure adequate flocculation.

In the process of performing backwash with electrochemical cleaning for regeneration described in step (3), the current should be controlled to be 0.2 A for a time of 30 min.

Acid orange 7 in simulated dye wastewater is treated in this step, and a concentration of acid orange 7 of to-be-treated pollutants is 20 mg/L.

Reaction parameters are controlled: an initial pH of the wastewater is adjusted to 6 to 8. The current density is adjusted to 90 A/m². A flocculation reaction time is controlled to be 30 min.

A treatment process is as follows: The wastewater with the adjusted pH is introduced into the electroflocculation reaction tank body 15, the stirring device 22 is turned on, the direct current power supply 21 is turned on, and a system voltage or current is set according to requirements. After the flocculation reaction lasts for a period of time, an external peristaltic pump needs to be used to pump the wastewater at a constant speed, filter the wastewater with the cathode of the fiber filter, and collect the effluent.

Treatment results are as follows: After a plurality of experiments and through detection, an average removal rate of acid orange 7 is over 95%, and a maximum removal rate is as high as 97.16% when the initial pH is adjusted to 7.

Embodiment 5

Figure 7:
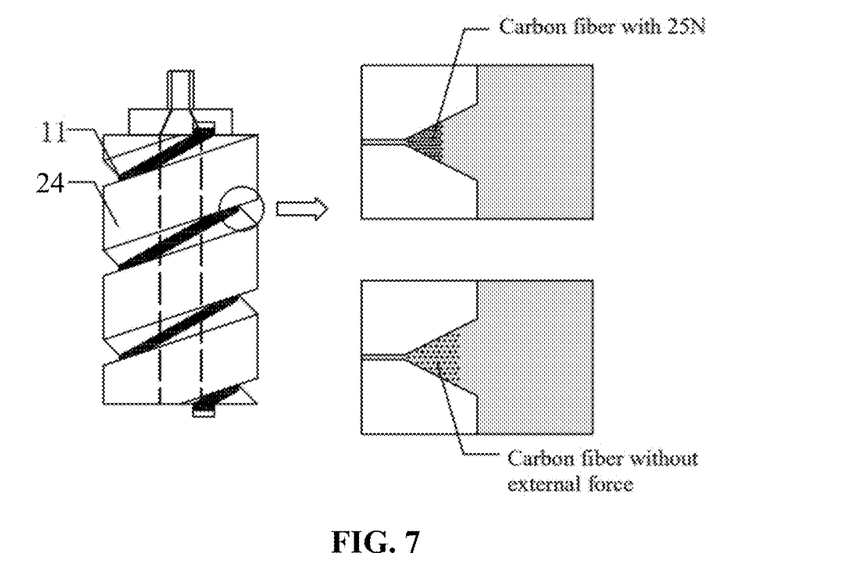
FIG. 7 is a schematic diagram of a structure of a spiral center filter body and comparison of a structure of carbon fiber yarn applied with a force of 25 N and without external force in Embodiment 5.

When filtration flux decreases to a specific level, filtration is stopped, and backwash for regeneration is performed on carbon fiber yarn 11. In this embodiment, a spiral center filter body 24 that is more convenient to adjust a force applied to the carbon fiber yarn 11 is used. A structure of the spiral center filter body 24 and comparison of a structure of the carbon fiber yarn 11 applied with a force of 25 N and without external force are shown in FIG. 7. An end of the carbon fiber yarn 11 is fixed at a lower portion of the spiral center filter body 24, and a pore size of the carbon fiber yarn 11 is adjusted by adjusting the tightness of an upper portion of the carbon fiber yarn 11. A quantity of spirals of the spiral center filter body 24 in this embodiment may be increased or decreased according to specific situations.

Figure 8:
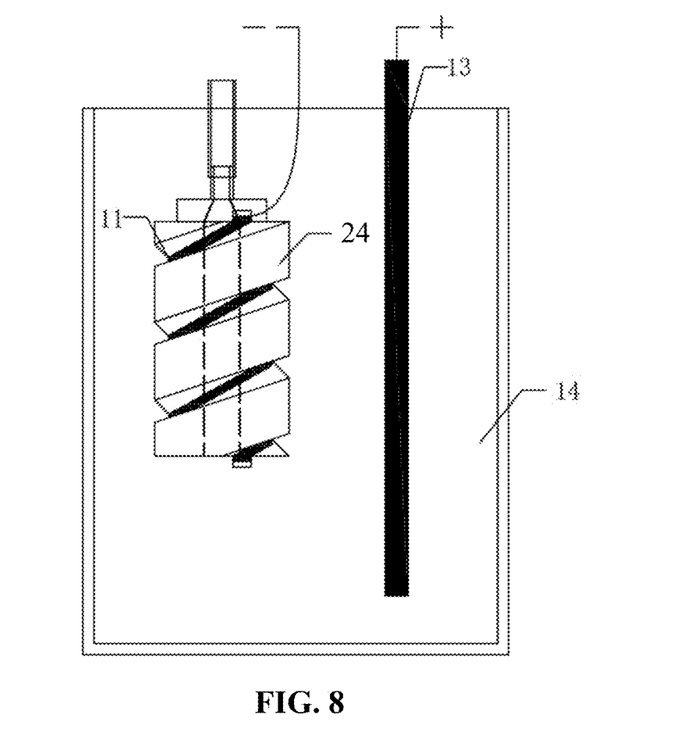
FIG. 8 is a schematic diagram of a backwash with electrochemical cleaning process of a fiber filter in Embodiment 5.

A specific implementation method for backwash for regeneration is as follows: The force applied to the carbon fiber yarn 11 is removed, so that gaps of a filter layer become larger. 400 mL 50 mmol/L $Na_2SO_4$ is used as an electrolyte 14. A dimensionally stable anode is used as an anode 13. The carbon fiber yarn 11 on the spiral center filter body 24 is used as a cathode. A direct current of 1.2 to 8 V is applied. The carbon fiber yarn 11 is backwashed by introducing the electrolyte 14 into the spiral center filter body 24 as backwash water. A large quantity of microbubbles is generated on a surface of an electrode by the applied direct current, to wash the surface of the carbon fiber yarn 11. In other embodiments, other electrolytes and anodes may be selected for backwash with electrochemical cleaning for regeneration. FIG. 8 is a schematic diagram of a backwash with electrochemical cleaning process of a fiber filter according to the disclosure.

The fiber filter of the disclosure filters a mixed solution under different backwash conditions such as backwash without electrochemical cleaning, backwash with electrochemical cleaning, and backwash with electrochemical cleaning without external force applied to carbon fibers, so as to measure specific flux changes of the fiber filter. Each of the conditions is that backwash is performed after the solution of 100 mL is filtered, and a comparison experiment of two cycles is carried out. After the backwash, the flux is recovered.

Figure 9:
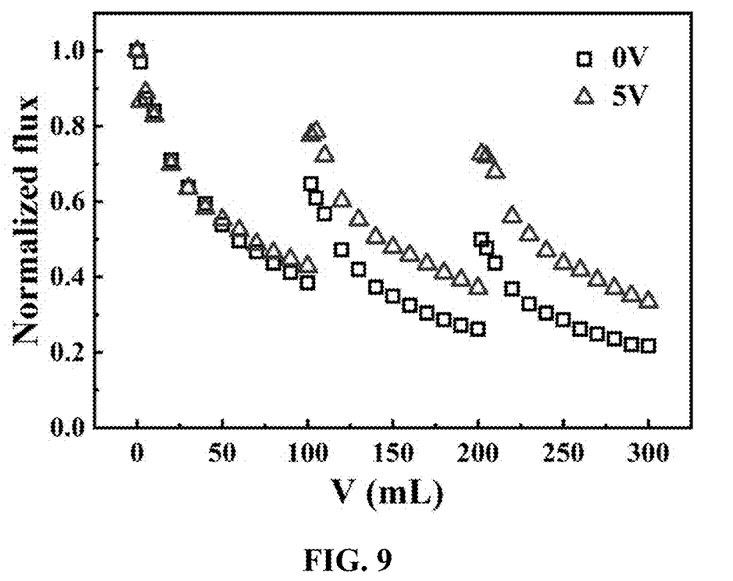
FIG. 9 shows specific flux changes of a fiber filter that filters a mixed solution under conditions of performing backwash without electrochemical cleaning and performing backwash with electrochemical cleaning in Embodiment 5.

FIG. 9 shows specific flux changes when backwash without electrochemical cleaning is performed (0 V) and backwash with electrochemical cleaning is performed (5 V). When backwash without electrochemical cleaning is performed (0 V), after first backwash, the specific flux is recovered from 0.4 to 0.6, and after second backwash, the specific flux is recovered from 0.2 to 0.5. When backwash with electrochemical cleaning is performed (5 V) for 5 min, after the first backwash, the specific flux is recovered from 0.4 to 0.8, and after the second backwash, the specific flux is recovered from 0.35 to 0.7, which indicates that the recovery effect is better than that of the backwash without electrochemical cleaning. Results indicate that backwash with electrochemical cleaning can effectively achieve flux recovery.

Figure 10:
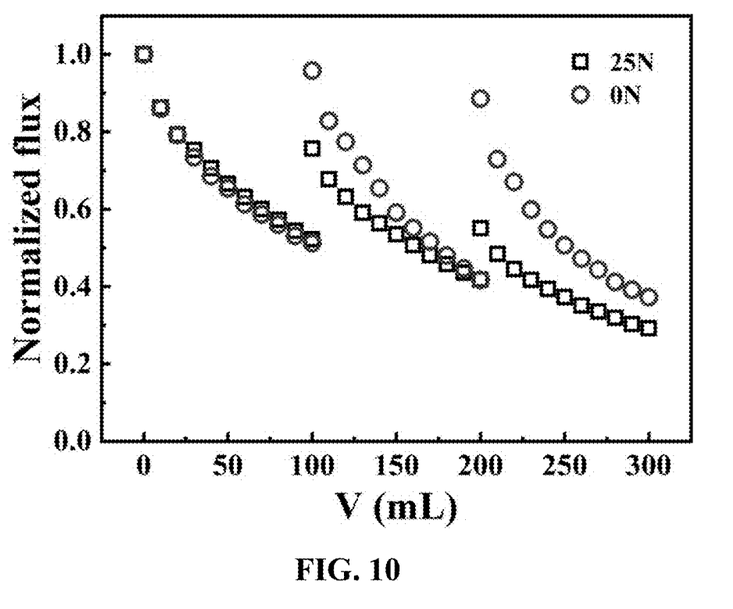
FIG. 10 shows specific flux changes of a fiber filter that performs backwash with electrochemical cleaning without external force applied to carbon fibers in Embodiment 5.

FIG. 10 shows specific flux changes when backwash with electrochemical cleaning is performed on the carbon fiber without external force. The electrochemical condition is that 2 V is applied for 1 min. The backwash with electrochemical cleaning is performed on the carbon fiber without external force applied, that is, the carbon fiber yarn 11 is loosened from an upper end of the spiral center filter body 24 to be free from a tension. After the first backwash, the specific flux is recovered from 0.5 to 0.88, and after the second backwash, the specific flux is recovered from 0.46 to 0.92. The specific flux is recovered from 0.46±0.04 to 0.89±0.03 in ten cycles of backwash with electrochemical cleaning. Results indicate that a better and more stable flux recovery can be achieved by backwash with electrochemical cleaning after removing the force applied to the spiral center filter body 24 by the carbon fiber yarn 11.

It will be obvious to those skilled in the art that changes and modifications may be made, and therefore, the aim in the appended claims is to cover all such changes and modifications.

What is claimed is:

1. A carbon fiber filter, comprising a center filter body and a carbon fiber yarn wound around the center filter body, wherein the center filter body is hollow and comprises a water outlet, a surface of the center filter body is provided with at least one groove, a plurality of through holes are arranged in the groove, the through holes and the water outlet are in communication with a hollow inner cavity of the center filter body, and the carbon fiber yarn is wound in the groove with a constant force to form a filter layer, wherein the groove is an inverted triangular groove with a lowermost angle of 10° to 160°.

2. The carbon fiber filter of claim 1, wherein the carbon fiber yarn is wound in the groove with a constant force of 10 N to 200 N.

3. The carbon fiber filter of claim 1, wherein the carbon fiber yarn is a modified carbon fiber yarn obtained through acid leaching.

4. The carbon fiber filter of claim 1, wherein the carbon fiber yarn is modified carbon fiber yarn obtained through ablation at a high temperature of 200° C. to 700° C.

5. The carbon fiber filter of claim 1, wherein the center filter body and the carbon fiber yarn wound around the center filter body are used as a cathode connected to a negative electrode of a power supply, to form an electroflocculation-fiber filtration water treatment device with an iron anode connected to a positive electrode of the power supply.

6. A regeneration method for the carbon fiber filter of claim 1, comprising: placing the carbon fiber yarn as a cathode in an electrolyte for backwashing without the constant force, performing water electrolysis after the carbon fiber yarn communicates with an anode, to generate a large quantity of microbubbles at the cathode, and washing a surface of the carbon fiber yarn for regeneration by using backwash water and the microbubbles.

7. The method of claim 6, comprising: placing the carbon fiber yarn as the cathode in the electrolyte after removing the constant force on the carbon fiber yarn.

8. The method of claim 6, wherein a voltage of 1.2 to 8 V is applied between the cathode and the anode in the water electrolysis.

9. An electroflocculation-fiber filtration water treatment device, comprising an anode and a cathode, wherein the anode is electrically connected to a positive electrode of a power supply, the cathode is electrically connected to a negative electrode of the power supply, and the cathode is a cathode of the carbon fiber filter of claim 1.

10. The device of claim 9, wherein the anode is an electroflocculation anode plate located upstream of a water flow direction and comprises one or more of iron, aluminum, an aluminum-containing composite material, and an iron-containing composite material.

* * * * *